(12) United States Patent
Saretto et al.

(10) Patent No.: US 11,273,423 B2
(45) Date of Patent: *Mar. 15, 2022

(54) TURBOMACHINE TYPE CHEMICAL REACTOR

(71) Applicant: DRESSER-RAND COMPANY, Houston, TX (US)

(72) Inventors: Silvano R. Saretto, Snoqualmie, WA (US); Kirk Ryan Lupkes, Issaquah, WA (US)

(73) Assignee: DRESSER-RAND COMPANY, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/395,096

(22) Filed: Aug. 5, 2021

(65) Prior Publication Data

US 2021/0362110 A1 Nov. 25, 2021

Related U.S. Application Data

(63) Continuation of application No. 17/272,747, filed as application No. PCT/US2019/051282 on Sep. 16, 2019, now Pat. No. 11,123,702.

(60) Provisional application No. 62/733,921, filed on Sep. 20, 2018.

(51) Int. Cl.
| | |
|---|---|
| *B01J 19/18* | (2006.01) |
| *B01J 19/20* | (2006.01) |
| *B01J 19/00* | (2006.01) |
| *B01J 3/08* | (2006.01) |

(52) U.S. Cl.
CPC ............... *B01J 3/08* (2013.01); *B01J 19/006* (2013.01); *B01J 19/1806* (2013.01); *B01J 19/20* (2013.01)

(58) Field of Classification Search
CPC ... B01J 3/08; B01J 19/20; B01J 19/006; B01J 19/1806
USPC .......................................................... 422/310
See application file for complete search history.

(56) References Cited

U.S. PATENT DOCUMENTS

| 2,258,793 A * | 10/1941 | New ....................... F01D 5/142 |
| | | 415/194 |
| 8,118,543 B2 | 2/2012 | Umeyama et al. |
| 10,427,129 B2 | 10/2019 | Lansell et al. |
| 11,059,018 B2 | 7/2021 | Saretto et al. |
| 11,123,702 B2 * | 9/2021 | Saretto ....................... B01J 3/08 |

FOREIGN PATENT DOCUMENTS

| CN | 101220819 A | 7/2008 |
| CN | 107921404 A | 4/2018 |

* cited by examiner

*Primary Examiner* — Huy Tram Nguyen

(57) ABSTRACT

A turbomachine type chemical reactor for processing a process fluid is presented. The turbomachine type chemical reactor includes at least one impeller section and a stationary diffuser section arranged downstream. The impeller section accelerates the process fluid to a supersonic flow. A shock wave is generated in the stationary diffuser section that instantaneously increases static temperature of the process fluid downstream the shock wave for processing the process fluid. which allows thermally cracking a chemical compound, such as hydrocarbon, in the process fluid. Static pressure of the process fluid is simultaneously increased across the shock wave. The turbomachine type chemical reactor significantly reduces residence time of the process fluid in the chemical reactor and improves efficiency of the chemical reactor.

19 Claims, 6 Drawing Sheets

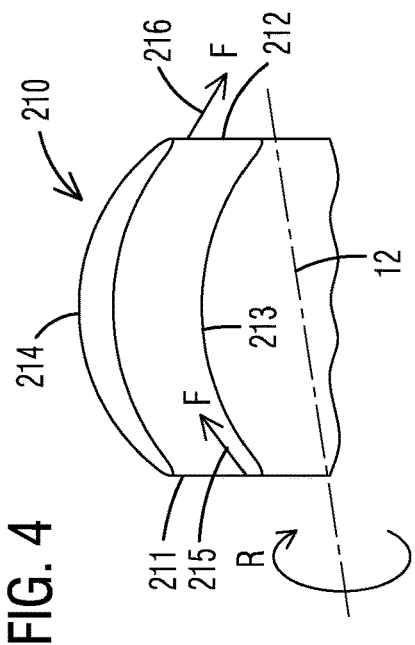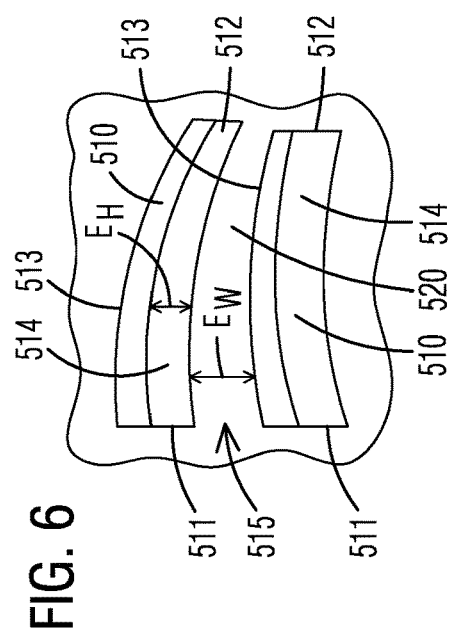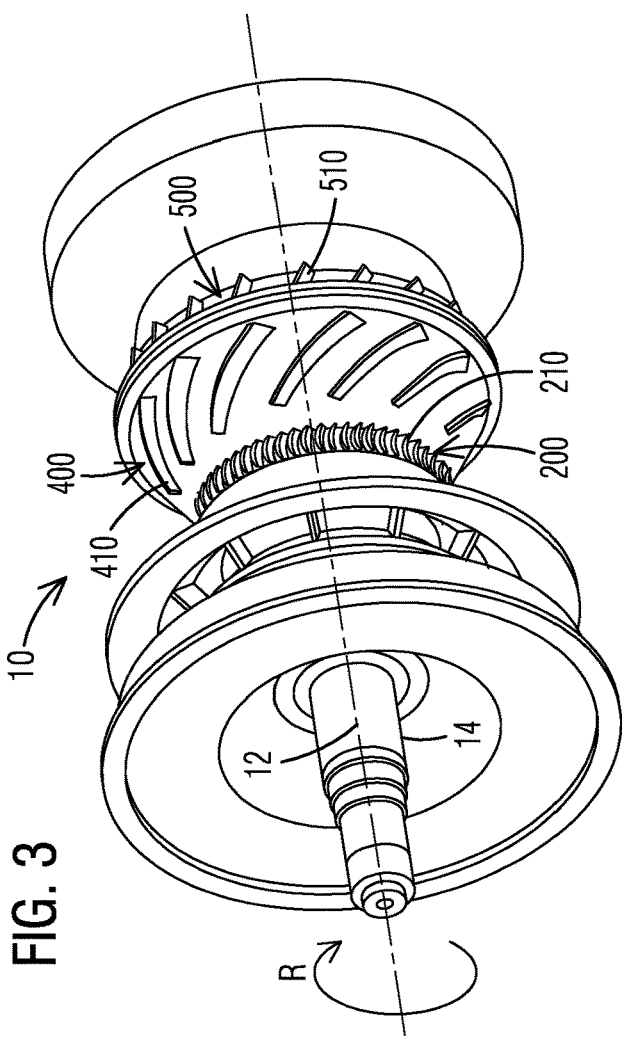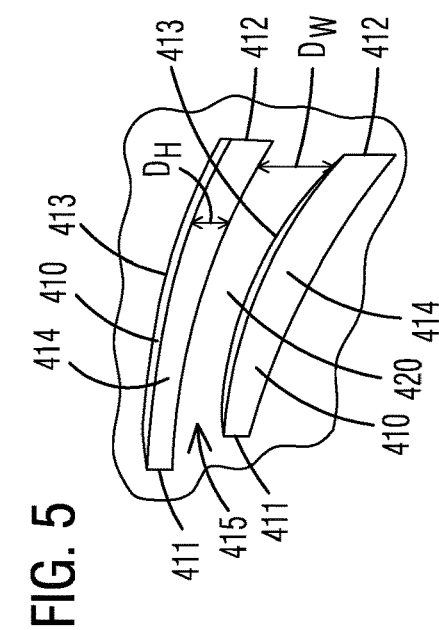

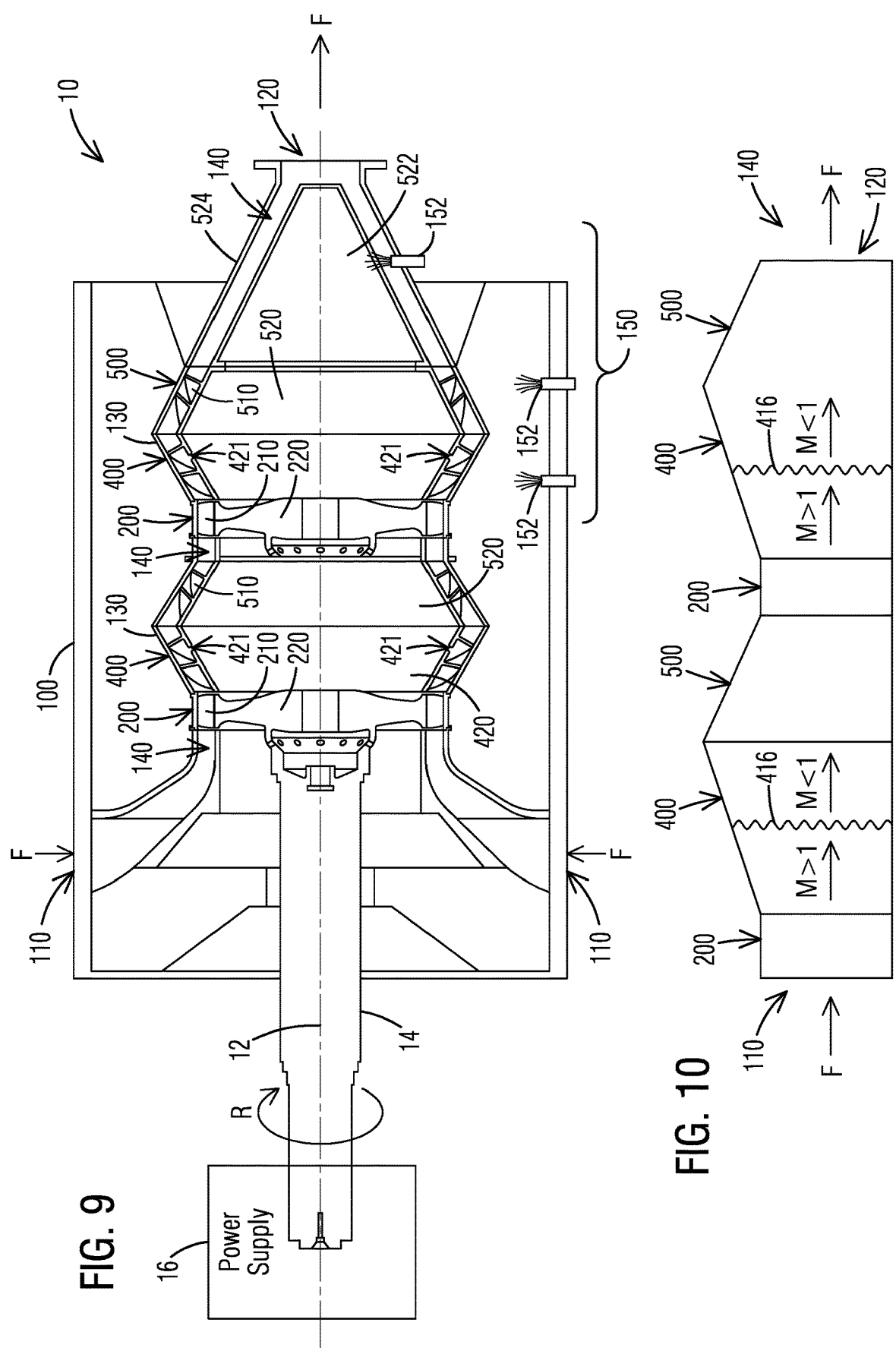

TURBOMACHINE TYPE CHEMICAL REACTOR

TECHNICAL FIELD

Disclosed embodiments relate generally to a turbomachine type chemical reactor, in particular, a turbomachine type chemical reactor for processing a process flow, more in particular, a turbomachine type chemical reactor for an endothermic process of a process fluid.

DESCRIPTION OF THE RELATED ART

An endothermic process may refer to a process that requires addition of heat to a process fluid to promote occurrence of endothermic chemical reactions. It may be used in oil refineries and petrochemical plants for fractioning or "cracking" heavier molecular weight hydrocarbons. After cracking, the lighter molecular weight hydrocarbons are used in the petrochemical industry as feedstock for production of other chemical compounds. In known, commercially practiced, pyrolysis-cracking processes, application of heat and pressure in furnace-type, chemical reactors, in low oxygen environments, fractionalizes heavier molecular weight hydrocarbons into various lighter molecular weight olefins, such as ethylene, without causing combustion. Another example of an endothermic process may be steam reforming of methane. Often, the heavier molecular weight hydrocarbon is entrained in heated steam. The steam- and hydrocarbon-containing process fluid flows through heat exchangers of the chemical reactor. Imparted temperature and residence time of the process fluid within heat exchangers are controlled to fracture the entrained hydrocarbons to the desired output, lower molecular weight hydrocarbons.

Using the example of ethylene production by pyrolysis, a process fluid comprising hydrocarbon and steam mixture is heated from 1220° F. to 1545° F. in less than 400 milliseconds (ms), in a furnace-type chemical reactor. The rate at which the heating is done and subsequently quenched (to halt further chemical reactions) is important for the production of the desired blend of hydrocarbons. Oxygen must not be present during the heating process, in order to avoid hydrocarbon combustion. The reaction process in the furnace-type chemical reactor requires large heat input and relatively slow mass flow rate of the process fluid. In order to meet output production goals, ethylene production plants employ multiple, parallel pyrolysis reactors, each requiring large thermal energy inputs. Each additional reactor needed to meet production goals increases capital spending, energy consumption to heat the process fluid, plant real estate space.

It is desirable to increase mass flow of process fluid during the hydrocarbon cracking process, with lower production energy input. Increased mass flow meets production goals with less plant equipment capital spending and real estate space.

BRIEF DESCRIPTION OF THE DRAWINGS

Exemplary embodiments of the application are explained in further detail with respect to the accompanying drawings. In the drawings:

FIG. 3 is a schematic perspective view of the chemical reactor of FIG. 1, with outer casing removed for clarity purpose;

FIG. 4 is a schematic section view of an impeller blade according to an embodiment;

FIG. 5 is a schematic view of a diffuser flow passage according to an embodiment;

FIG. 6 is a schematic perspective view of an exhaust flow passage according to an embodiment;

FIG. 9 is a schematic longitudinal section view of a chemical reactor according to a further embodiment;

FIG. 10 is a schematic process diagram of a process fluid flowing through a flow path of the chemical reactor shown in FIG. 9;

To facilitate understanding, identical reference numerals have been used, where possible, to designate identical elements that are common to the figures.

DETAILED DESCRIPTION

A detailed description related to aspects of disclosed embodiments is described hereafter with respect to the accompanying figures.

For illustration purpose, term "axial" or "axially" refers to a direction along a longitudinal axis of a chemical reactor, term "radial" or "radially" refers to a direction perpendicular to the longitudinal axis of the chemical reactor, term "downstream" or "aft" refers to a direction along a flow direction, term "upstream" or "forward" refers to a direction against the flow direction.

Figure 1:
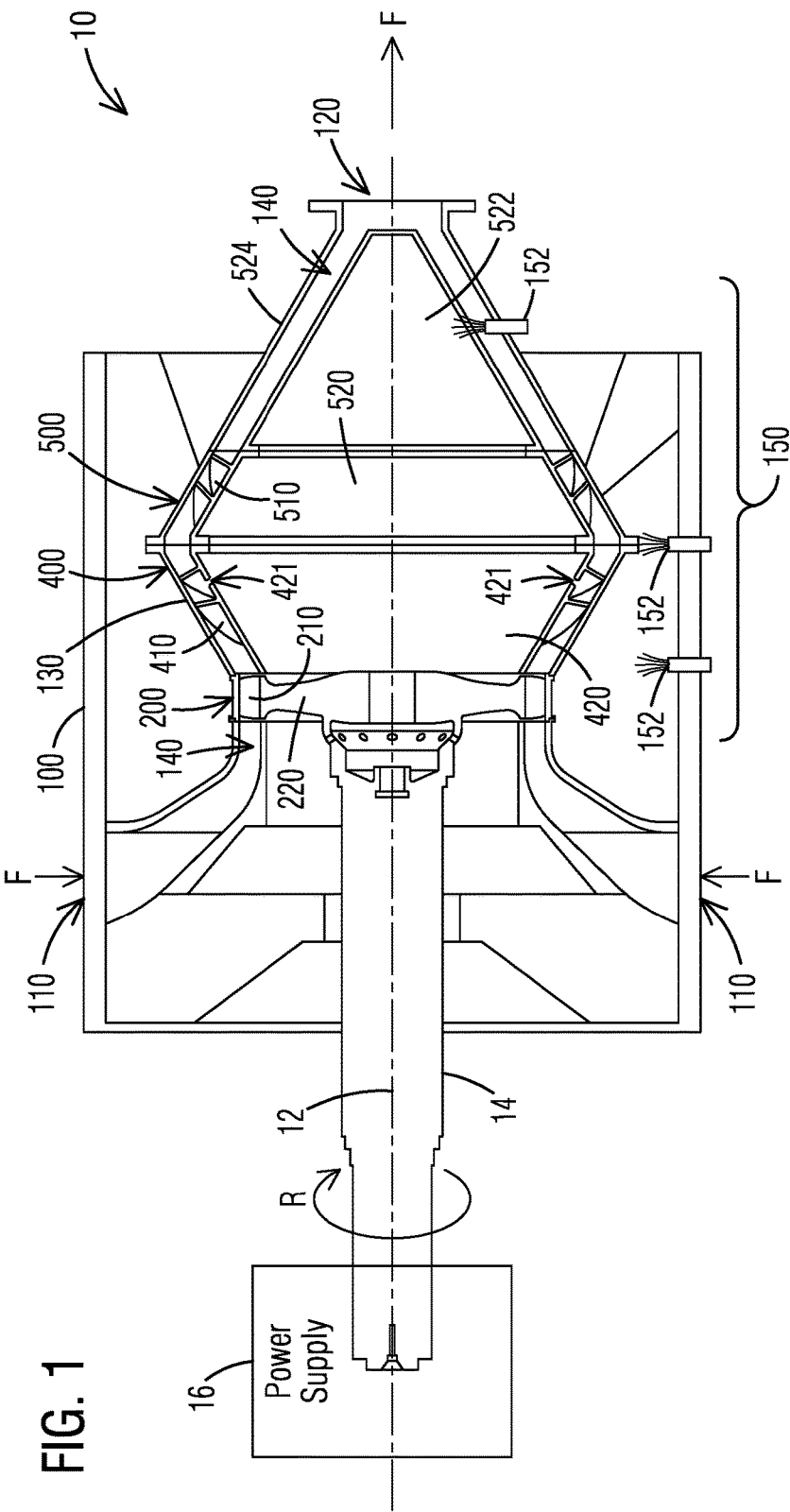
FIG. 1 is a schematic longitudinal section view of a chemical reactor according to an embodiment.

FIG. 1 illustrates a schematic longitudinal section view of a chemical reactor 10 according to an embodiment. In this embodiment, the chemical reactor 10 is a single stage chemical reactor 10 having one impeller section 200 and one stationary diffuser section 400. The impeller section 200 and the stationary diffuser section 400 function like a turbomachine. As shown in FIG. 1, the chemical reactor 10 includes an outer casing 100 enclosing a plurality of components along a longitudinal axis 12. The component includes the impeller section 200 and the stationary diffuser section 400. The outer casing 100 has a flow inlet 110 for intaking process fluid F. The outer casing 100 has a flow exit 120 for exiting the process fluid F. The flow inlet 110 and the flow exit 120 may have radial or axial orientation. In the exemplary embodiment of FIG. 1, the flow inlet 110 has a radial orientation and the flow exit 120 has an axial orientation. It is understood that the flow inlet 110 and the flow exit 120 may have any combinations of radial or axial orientations.

The outer casing 100 has an inner shroud 130 extending in the axial direction. An annual flow path 140 is defined within the outer casing 100 axially along the inner shroud 130 between the flow inlet 110 and the flow exit 120. The process fluid F enters the flow path 140 via the flow inlet 110 and exits the flow path 140 via the flow exit 120 defining an axial flow path. For example, a chemical compound, such as hydrocarbon in the process fluid F, is thermally cracked while the process fluid F flows through the flow path 140.

The chemical reactor 10 includes a rotary shaft 14 axially extending into the outer casing 100. The rotary shaft is connected to a power supply 16 that drives and rotates the rotary shaft 14 in a rotation direction R around the longitudinal axis 12. In the exemplary embodiment shown in FIG. 1, the rotation direction R is clockwise. It is understood that the rotation direction R can be counterclockwise in other embodiments. The power supply 16 includes an electric motor, a steam turbine, a gas turbine, or any combustion engine or power supplies known in the industrial.

Referring to FIG. 1, the impeller section 200 includes a plurality of rotating impeller blades 210 positioned on a rotor disk 220. The rotating impeller blades 210 may be manufactured integral to the rotor disk 220 as one component. Alternatively, the rotating impeller blades 210 may be manufactured separately and mounted on the rotor disk 220. The rotor disk 220 is coupled to the rotary shaft 14. The rotating impeller blades 210 are circumferentially spaced apart from each other and extends radially outwardly from the rotor disk 220 into the flow path 140. The flow path 140 is formed between the rotor disk 220 and the inner shroud 130 of the outer casing 100. The impeller section 200 is designed to accelerate the process fluid F in the flow path 140 to a supersonic flow having a Mach number M that is greater than 1.

The stationary diffuser section 400 is arranged downstream of the impeller section 200. The stationary diffuser section 400 has a divergent shape. The stationary diffuser section 400 includes a plurality of stationary diffuser vanes 410 positioned on a stationary diffuser hub 420. The stationary diffuser vanes 410 may be manufactured integral to the stationary diffuser hub 420 as one component. Alternatively, the stationary diffuser vanes 410 may be manufactured separately and mounted on the stationary diffuser hub 420. The stationary diffuser vanes 410 are circumferentially spaced apart from each other and extends radially outwardly from the stationary diffuser hub 420 into the flow path 140. The flow path 140 is formed between the stationary diffuser hub 420 and the inner shroud 130 of the outer casing 100. A shock wave 416 (shown in FIG. 2) is generated in the stationary diffuser section 400 by applying an appropriate back pressure at an exit of the stationary diffuser section 400.

The chemical reactor 10 includes an exhaust section 500 arranged downstream of the stationary diffuser section 400. The exhaust section 500 includes a plurality of stationary exhaust vanes 510 positioned on a stationary exhaust hub 520. The stationary exhaust vanes 510 may be manufactured integral to the stationary exhaust hub 520 as one component. Alternatively, the stationary exhaust vanes 510 may be manufactured separately and mounted on the stationary exhaust hub 520. The stationary exhaust vanes 510 are circumferentially spaced apart from each other and extends radially outwardly from the stationary exhaust hub 520 into the flow path 140. The flow path 140 is formed between the stationary exhaust hub 520 and the inner shroud 130 of the outer casing 100. The exhaust section 500 includes an exhaust cone 522 and an exit transition 524 arranged downstream of the stationary exhaust vanes 510. The flow path 140 axially extends through a passage between the exhaust cone 522 and the exit transition 524 and exits the outer casing 100 at the flow exit 120.

Figure 2:
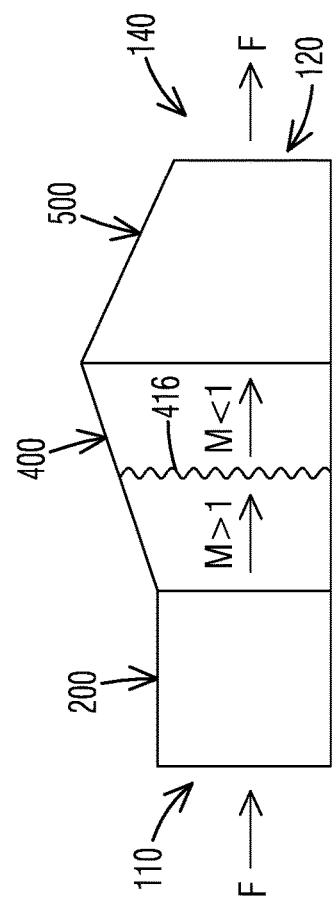
FIG. 2 is a schematic process diagram of a process fluid flowing through a flow path of the chemical reactor shown in FIG. 1 according to an embodiment.

FIG. 2 is a schematic process diagram of the process fluid F flowing through the flow path 140 of the chemical reactor 10 shown in FIG. 1. The process fluid F enters the flow path 140 via the flow inlet 110. The process fluid F axially flows through the impeller section 200 and is accelerated to a supersonic flow. The supersonic process fluid F is directed into the stationary diffuser section 400 and is decelerated to a subsonic flow having a Mach number M that is less than 1 across the shock wave 416. The shock wave 416 instantaneously significantly increases a static temperature T of the process fluid F downstream of the shock wave 416 which generates sufficient heat to, for example, crack hydrocarbon in the process fluid F. The shock wave 416 simultaneously and instantaneously increased a static pressure P of the process fluid F downstream of the shock wave 416 which generates a desired outlet pressure of the chemical reactor 10. The process fluid F is directed into the exhaust section 500 and exits the flow path 140 via the flow exit 120.

FIG. 3 is a schematic perspective view of the chemical reactor 10 shown in FIG. 1. The outer casing 100 is removed in FIG. 3 for clarity purpose. FIG. 4 is a schematic view of the rotating impeller blade 210. FIG. 5 is a schematic view of adjacent stationary diffuser vanes 410. FIG. 6 is a schematic view of adjacent stationary exhaust vanes 510.

Referring to FIG. 1, FIG. 3 and FIG. 4, the impeller section 200 includes a plurality of rotating impeller blades 210 positioned on the rotor disk 220. The rotating impeller blades 210 are circumferentially spaced apart from each other and extend radially outwardly from the rotor disk 220 into the flow path 140. As shown in FIG. 4, each rotating impeller blade 210 has a leading edge 211 facing upstream and a trailing edge 212 facing downstream. Each rotating impeller blade 210 has a concave side 213 and a convex side 214 between the leading edge 211 and the trailing edge 212. Upon rotating by the rotor disk 220, the rotating impeller blades 210 accelerate the process fluid F by changing a flow direction of the process fluid F from a direction 215 at the leading edge 211 to a direction 216 at the trailing edge 212. The flow direction 215 at the leading edge 211 flow and the flow direction 216 at the trailing edge 212 are tangential relative to the longitudinal axis 12. The rotating impeller blades 210 have supersonic blade profiles. The rotating impeller blades 210 accelerate the process fluid F to a supersonic flow at the trailing edge 212. Acceleration rate of the process fluid F is determined by an amount of the flow direction change. The higher rate the process fluid F accelerates, the larger amount the flow direction changes from the leading edge 211 to the trailing edge 212. Static pressure and temperature of the process fluid F are not significantly changed at the trailing edge 212 compared to at the leading edge 211.

Referring to FIG. 1, FIG. 3 and FIG. 5, the supersonic process fluid F is discharged from the impeller section 200 into the stationary diffuser section 400. The stationary diffuser section 400 includes a plurality of stationary diffuser vanes 410 positioned on a stationary diffuser hub 420. The stationary diffuser vanes 410 are circumferentially spaced apart from each other and extends radially outwardly from the stationary diffuser hub 420 into the flow path 140. As shown in FIG. 5, each stationary diffuser vane 410 has a leading edge 411 facing upstream and a trailing edge 412 facing downstream. Each stationary diffuser vane 410 has two opposing sides 413 and 414 between the leading edge 411 and the trailing edge 412. A diffuser flow passages 415 is formed circumferentially between adjacent stationary diffuser vanes 410 and radially between the stationary diffuser hub 420 and the inner shroud 130. A cross sectional area $D_A$ of the diffuser flow passage 415 is determined by a cross sectional height $D_H$ and a cross sectional width $D_W$ of the diffuser flow passage 415. The cross sectional height $D_H$ of the diffuser flow passage 415 is defined radially between the stationary diffuser hub 420 and the inner shroud 130. The cross sectional width $D_W$ of the diffuser flow passage 415 is defined circumferentially between adjacent facing sides 413 and 414 of the adjacent stationary diffuser vanes 410. The diffuser flow passage 415 is designed as divergent along the axial direction.

A shock wave 416 of the process fluid F is generated at an axial location in the stationary diffuser section 400 by applying an appropriate back pressure at an exit of the stationary diffuser section 400, in this embodiment, at the trailing edge 412 of the stationary diffuser vane 410. The supersonic process fluid F continuously accelerates along the divergent stationary diffuser section 400 as the cross sectional area $D_A$ of the diffuser flow passage 415 gets larger. The region of the supersonic acceleration of the process fluid F is terminated by the shock wave 416. The axial location of the shock wave 416 in the stationary diffuser section 400 is a function of the back pressure. The lower the back pressure is, the further downstream the axial location of the shock wave 416 is, the longer the region of the supersonic acceleration of the process fluid F is. By adjusting a divergent rate of the diffuser flow passage 415, or by adjusting the back pressure at the trailing edge 412 of the stationary diffuser vane 410, or by adjusting both, the process fluid F may achieve a high supersonic Mach number M upstream the shock wave 416. The divergent rate of the diffuser flow passage 415 can be adjusted by adjusting the cross sectional area $D_A$ of the diffuser flow passage 415 along the axial direction, which can be achieved by adjusting the cross sectional height $D_H$ of the diffuser flow passage 415 along the axial direction, or by adjusting the cross sectional width $D_W$ of the diffuser flow passage 415 along the axial direction, or by adjusting both.

Still referring to FIG. 1, FIG. 3 and FIG. 5, the stationary diffuser vanes 410 may have a helical profile. The process fluid F swirls when passing through the diffuser flow passage 415 formed between the adjacent helical stationary diffuser vanes 410. The high accelerated and swirled process fluid F in the stationary diffuser section 400 upstream the shock wave 416 may be segregated into components having different molecule weights due to the high centrifugal force in the stationary diffuser section 400. Components in the process fluid F having low molecule weights, such as hydrogen, flow in a low radial position in the diffuser flow passage 415 toward the stationary diffuser hub 420. Components in the process fluid F having high molecule weights, such as $CO_2$, hydrocarbon, or steam, flow in a high radial position in the diffuser flow passage 415 toward the inner shroud 130. The stationary diffuser section 400 may include at least one aperture 421 arranged on the stationary diffuser hub 420 downstream the shock wave 416. The low molecule weight components in the process fluid F may be extracted through the aperture 421 and removed from the process fluid F for the remaining flow path 140. A plurality of apertures 421 may be arranged on the stationary diffuser hub 420 downstream the shock wave 416.

The shock wave 416 instantaneously decreases the supersonic process fluid F to a subsonic process fluid F across the shock wave 416. A static temperature of the process fluid F is instantaneously increased across the shock wave 416. A static pressure of the process fluid F is simultaneously and instantaneously increased across the shock wave 416. The increased static temperature of the process fluid F downstream the shock wave 416 generates enough heat to, for example, crack the heavier molecular weight hydrocarbons in the process fluid F. The shock wave 416 significantly reduces the heating and pressurization process time of the process fluid F and thus significantly reduces residence time of the process fluid F within the chemical reactor 10. A ratio of the static temperature and a ratio of the static pressure across the shock wave 416 is a function of the upstream Mach number M of the process fluid F and property of the process fluid.

Referring to FIG. 1, FIG. 3 and FIG. 6, the subsonic process fluid F is discharged from the diffuser section 400 to the stationary exhaust vanes 510 in the exhaust section 500. As shown in FIG. 6, each stationary exhaust vane 510 has a leading edge 511 facing upstream and a trailing edge 512 facing downstream. Each stationary exhaust vane 510 has two opposing sides 513 and 514 between the leading edge 511 and the trailing edge 512. A plurality of exhaust flow passages 515 are formed between adjacent stationary exhaust vanes 510 and between the stationary exhaust hub 520 and the inner shroud 130. A cross sectional area $E_A$ of the exhaust flow passage 515 is determined by a cross sectional height $E_H$ and a cross sectional width $E_W$ of the exhaust flow passage 515. The cross sectional height $E_H$ of the exhaust flow passage 515 is defined radially between the stationary exhaust hub 520 and the inner shroud 130. The cross sectional width $E_W$ of the exhaust flow passage 515 is defined circumferentially between adjacent facing sides 513 and 514 of the adjacent stationary exhaust vanes 510. The exhaust flow passage 515 is designed as convergent along the axial direction. By adjusting a convergent rate of the exhaust flow passage 515, an appropriate back pressure may be applied at the exit of the stationary diffuser section 400. A desired supersonic Mach number M of the process fluid F can be achieved upstream of the shock wave 416, as noted above. The convergent rate of the exhaust flow passage 515 can be adjusted by adjusting the cross sectional area $E_A$ of the exhaust flow passage 515 along the axial direction, which can be achieved by adjusting the cross sectional height $E_H$ of the exhaust flow passage 515 along the axial direction, or by adjusting the cross sectional width $E_W$ of the exhaust flow passage 515 along the axial direction, or by adjusting both.

The process fluid F is discharged from the stationary exhaust vane 510 to the flow path 140 between the exhaust cone 522 and the exit transition 524 to the flow exit 120. According to another embodiment, the process fluid F may also be discharged from the stationary exhaust vanes 510 to another stage of the chemical reactor 10 for further processing. The stationary exhaust vanes 510 may align the flow direction of the process fluid F exiting the first stage with the leading edges 211 of the rotating impeller blades 210 of another stage.

Referring to FIG. 1, the chemical rector 10 includes a quenching zone 150 arranged downstream of the impeller section 200. The quenching zone 150 includes at least one nozzle 152. The nozzle 152 is in fluid communication with the process fluid F. The nozzle 152 may introduce coolant flow into the process fluid F for stabilizing temperature of the process fluid F. The nozzle 152 may also introduce anti-fouling fluid into the process fluid F for inhibiting fouling within the chemical reactor 10.

Figure 7:
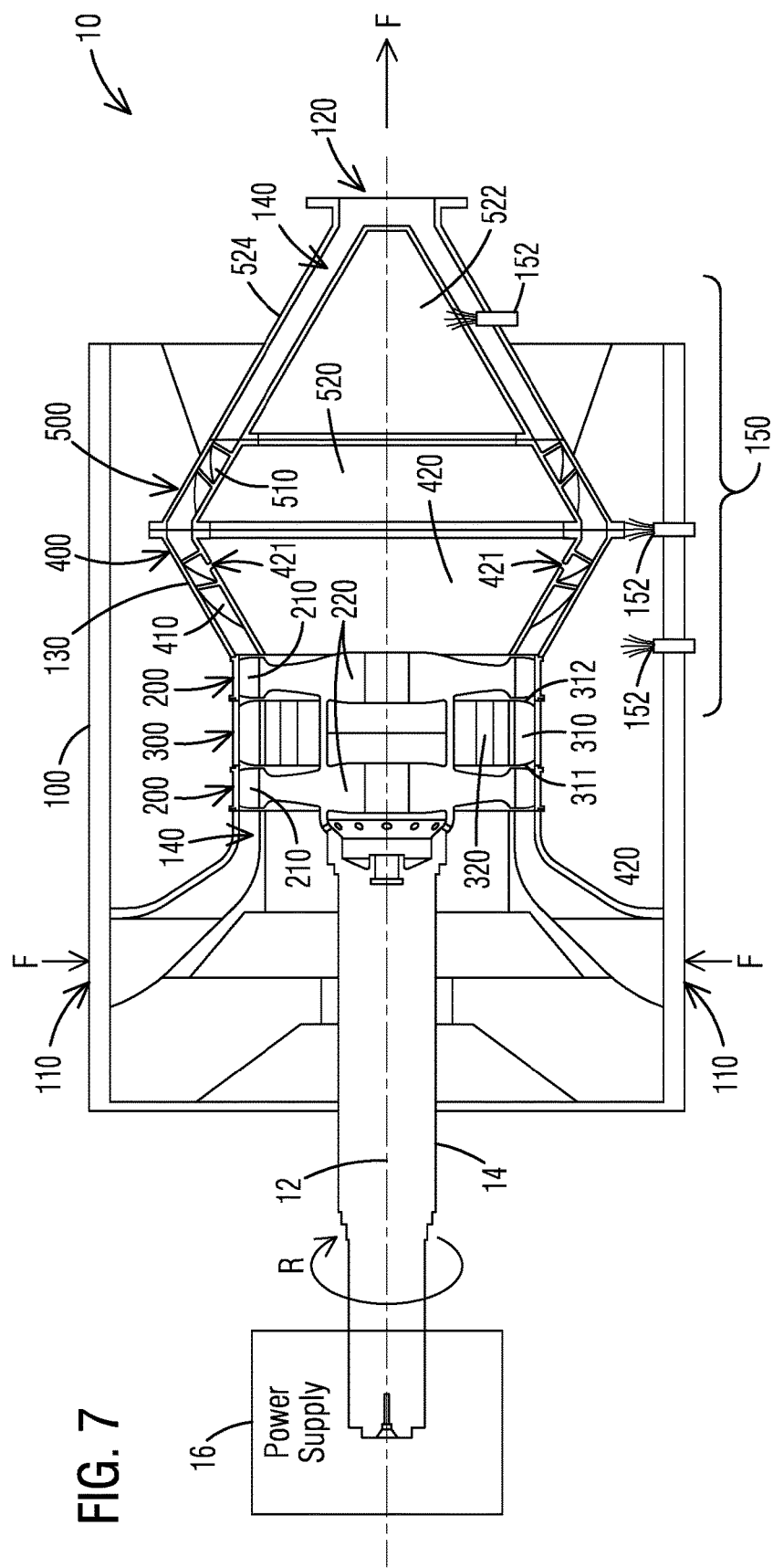
FIG. 7 is a schematic longitudinal section view of a chemical reactor according to another embodiment.
Figure 8:
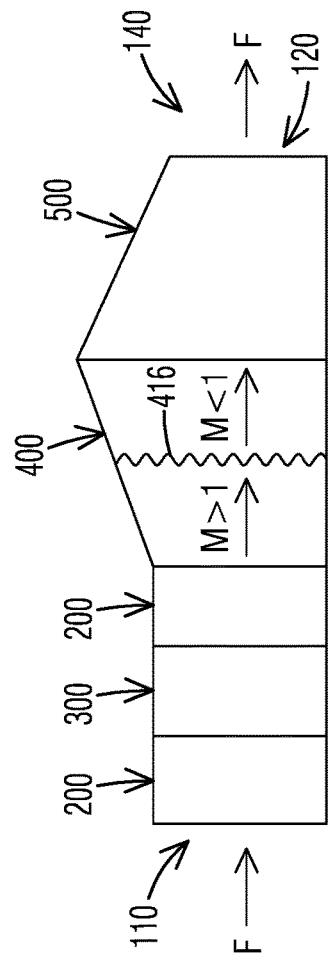
FIG. 8 is a schematic process diagram of a process fluid flowing through a flow path of the chemical reactor shown in FIG. 7.

FIG. 7 is a schematic longitudinal section view of a chemical reactor 10 according to an embodiment. In this embodiment, the chemical reactor 10 is a single stage chemical reactor 10 having dual impeller sections 200 and one stationary diffuser section 400. A stationary bucket section 300 is arranged between the dual impeller sections 200. The stationary bucket section 300 includes a plurality of stationary bucket vanes 310 positioned on a stationary bucket vane hub 320. The stationary bucket vanes 310 may be manufactured integral to the stationary bucket vane hub 320 as one component. Alternatively, the stationary bucket vanes 310 may be manufactured separately and mounted on the stationary bucket vane hub 320. The stationary bucket vanes 310 are circumferentially spaced apart from each other and extends radially outwardly from the stationary bucket hub 320 into the flow path 140. Each stationary bucket vane 310 has a leading edge 311 facing upstream and a trailing edge 312 facing downstream. The stationary bucket vanes 310 align the flow direction of the process fluid F exiting from the trailing edge 212 of the upstream rotating impeller blade 210 with the leading edge 211 of the downstream rotating impeller blade 210. The downstream impeller section 200 may further accelerate the velocity of the process fluid F prior to entering the stationary diffuser section 400. The rotating impeller blades 210 in each impeller section 200 may have the same or different configurations. The chemical reactor 10 having dual impeller sections 200 may reduce the inlet velocity of the process fluid F at the flow inlet 110 compared to a chemical reactor 10 having one impeller section 200. The chemical reactor 10 having dual impeller sections 200 may reduce velocity of the process fluid F at the flow inlet 120 and may require less flow direction changing in the rotating impeller blades 210 compared to a chemical reactor 10 having one impeller section 200. FIG. 8 is a schematic process diagram of the process fluid flowing through the flow path 140 of the dual impeller single stage chemical reactor 10 shown in FIG. 7.

FIG. 9 illustrates a schematic longitudinal section view of a chemical reactor 10 according to an embodiment. In this embodiment, the chemical reactor 10 is a two-stage chemical reactor 10. The two-stage chemical reactor 10 includes an upstream stage and a downstream stage. Each stage has one impeller section 200 and one stationary diffuser section 400. It is understood that each stage or one of the two stages may have dual impeller sections 200 and one stationary diffuser section 400 as illustrated in FIG. 7 and FIG. 8. The two stages may be enclosed within a common outer casing 100. Alternatively, the two stages may also be enclosed within two separate outer casings 100. The two-stage chemical reactor 10 generates an upstream shock wave 416 and a downstream shock wave 416 in the upstream stage and the downstream stage respectively to improve cracking process of the process fluid F. The two-stage chemical reactor 10 may reduce velocity of the process fluid F at the flow inlet 120 and may require less flow direction changing in the rotating impeller blades 210. FIG. 10 is a schematic process diagram of the process fluid F flowing through the flow path 140 of the two-stage chemical reactor 10 shown in FIG. 9.

Referring to FIG. 9, the upstream stationary diffuser section 400 includes at least one aperture 421 arranged on the stationary diffuser hub 420 downstream of the upstream shock wave 416. Low molecule weight components in the process fluid F are extracted through the aperture 421 and removed from the process fluid F for the remaining flow path 140. The process fluid F having the high molecule weight components flows into the downstream stage for further process. Efficiency of the chemical reactor 10 is significantly improved.

Figure 11:
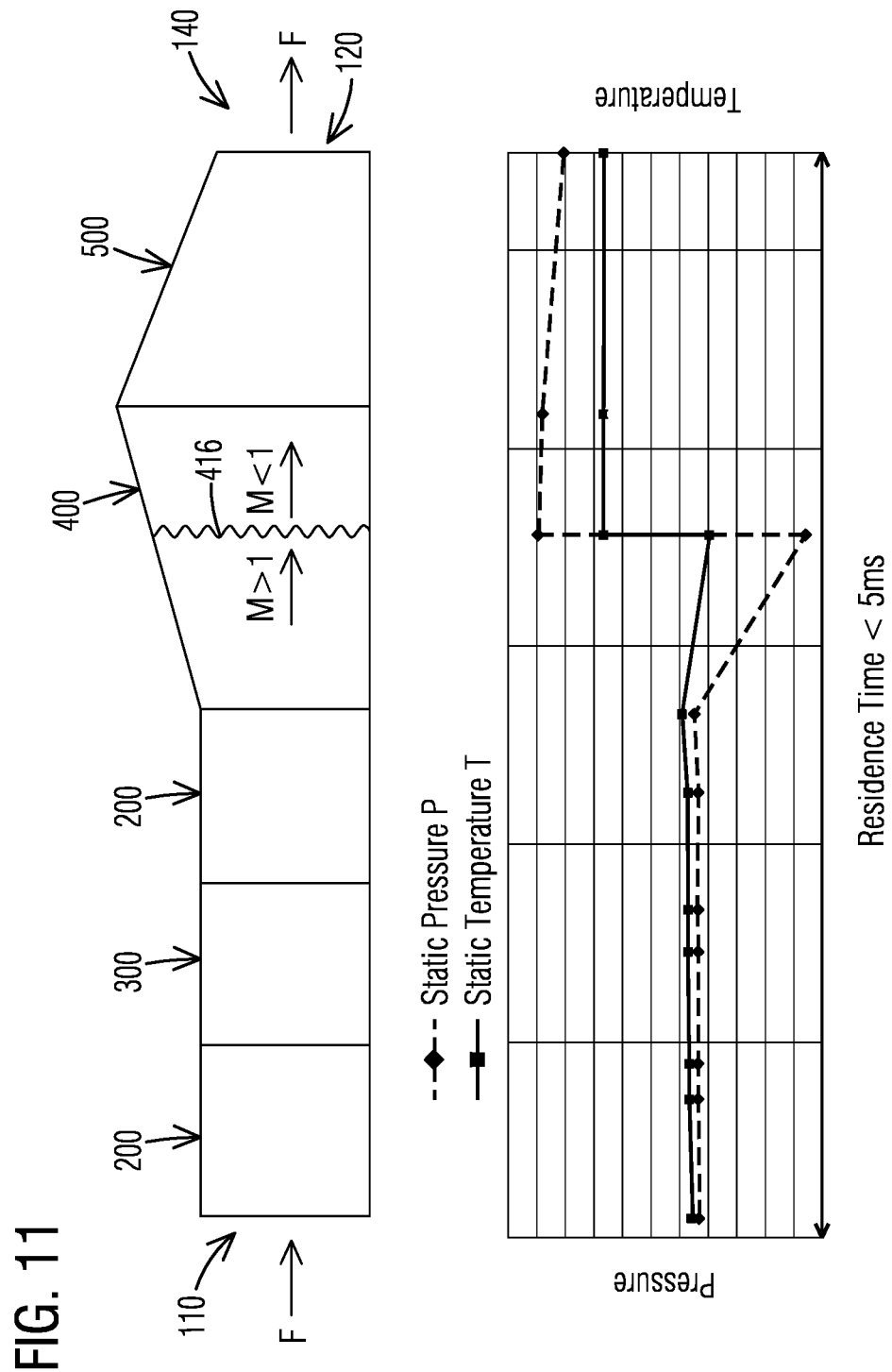
FIG. 11 is schematic process diagram of a process fluid flowing through a flow path of a chemical reactor and a chart of calculated static pressure and temperature of the process fluid at various locations along the flow path of the chemical reactor according to an embodiment.

FIG. 11 is a schematic process diagram of the process fluid F flowing through the flow path 140 of the chemical reactor 10 having of dual impeller sections 200 as shown in FIG. 8. A chart of calculated static temperature T and static pressure P of the process fluid F at various locations along the flow path 140 is disposed below the process diagram. The chart of the calculated static temperature T and static pressure P of the process fluid F at various locations along the flow path 140 shown in FIG. 11 is for illustration purpose only. It is understood that values of the static temperature T and static pressure P of the process fluid F at various locations along the flow path 140 vary corresponding to different geometries of the chemical rector 10 and property of the process fluid F. For example, the process fluid F is a hydrocarbon-containing process fluid.

As shown in FIG. 11, the static temperature and the static pressure P are simultaneously and instantaneously increased across the shock wave 416. As noted above, by tailoring geometry of the chemical reactor 10, such as the profile of the rotating impeller blades 210, the divergent rate of the diffuser flow passage 415, the convergent rate of the exhaust flow passage 515, a desired ratio of the static temperature T and a desired ratio of the static pressure P across the shock wave 416 are achieved to, for example, thermally crack the hydrocarbons in the process fluid F. For example, a ratio of the static temperature T across the shock wave 416 may be increased by at least ten percent (10%). A ratio of the static pressure P across the shock wave 416 may be increased by less than ten percent (10%), or by at least ten percent (10%), or by as much as twice or three times. The total increase of the static pressure P across the chemical reactor 10 is less than the static pressure P increased across the shock wave 416. The residence time in the chemical reactor 10 is significantly reduced, for example in an order of 10 milliseconds, or in an order of 5 milliseconds, or even in an order of 1 millisecond, compared to hundreds of milliseconds within known commercially practiced chemical reactors, such as furnace-type chemical reactor. The simultaneous heating and pressurization of the process fluid F across the shock wave 416 in the turbomachine type chemical reactor 10 may reduce gas compressors and heat exchangers which are used in a furnace-type chemical reactor and thus reduces the cost and complexity of an oil refinery and petrochemical plant and improves reliability of the oil refinery and petrochemical plant.

The process fluid F exiting the stationary diffuser section 400 is directed to the stationary exhaust vane 510 of the exhaust section 500. Cracking reaction may continue through the stationary exhaust vane 510. The cracking reaction may absorb heat from the process fluid F which may effectively stop chemical reactions in the process fluid F and reduces temperature of the process fluid F downstream of the shock wave 416. The process fluid F may exit the chemical reactor 10 at the flow exit 120 for a single stage chemical reactor 10. Alternatively, the process fluid F may enter a second stage for a two-stage chemical reactor 10 as illustrated in FIGS. 9 and 10, in which the process fluid F is re-accelerated to a supersonic flow, simultaneously and instantaneously increase the static temperature T and the static pressure P across a second shock wave 416 in the second stage which is similar as illustrated in FIG. 11. A quenching zone 150 may be incorporated in the second stage reactor downstream of the second impeller section 200 to control the cracking reaction rate by injection of cooling steam or other cooling and/or anti-fouling fluids into the flow path 140.

Figure 12:
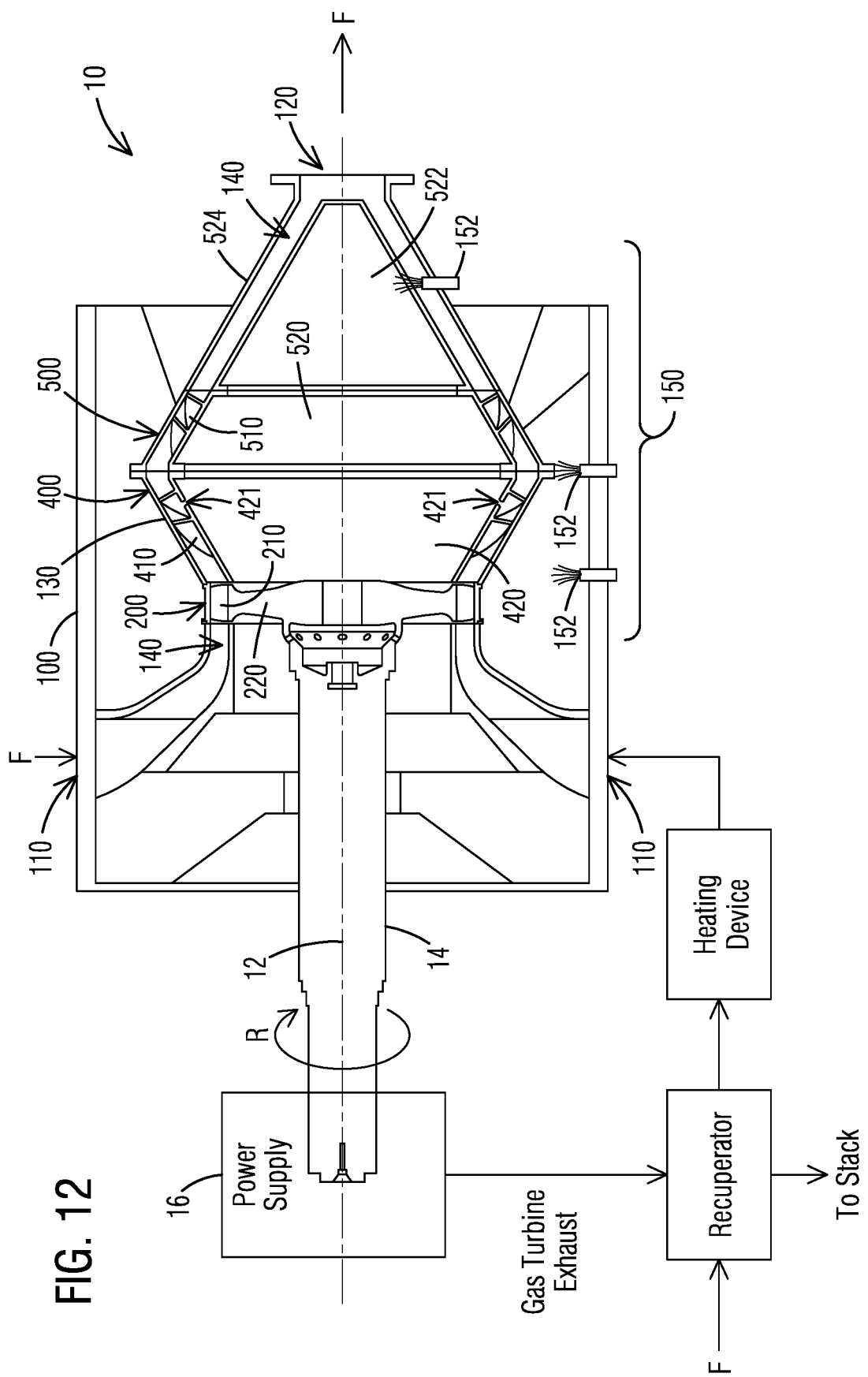
FIG. 12 is a schematic longitudinal section view of a chemical reactor according to another further embodiment.

FIG. 12 is a schematic longitudinal section view of a chemical reactor 10 according to an embodiment. In this exemplary embodiment, the power supply 16 is a gas turbine 16. A recuperator 17 is operatively connected to the gas turbine 16 to extract the gas turbine exhaust gas to preheat the process fluid F. The exhaust gas is then passed to a stack. A heating device 18 may be operatively connected to the recuperator 17 to further heat the process fluid F. The heating device 18 may be a furnace, or any types of heating device known in the industry. The heated process fluid F is then introduced to the flow inlet 110 of the chemical reactor 10, as illustrated above with references of FIGS. 1 to 11. Such arrangement utilizes waste heat from the gas turbine 10 and improves efficiency of the cracking process of the process fluid F.

According to an aspect, the proposed chemical reactor 10 is a turbomachine type chemical reactor for thermally cracking a chemical compound in a process fluid, such as hydrocarbons in process fluid F in an oil refinery and petrochemical plant. The proposed turbomachine type chemical reactor 10 includes at least one impeller section 200 and a stationary diffuser section 400 to generate a shock wave 416 in the stationary diffuser section 400. The shock wave 416 instantaneously increases the static temperature T of the process fluid F downstream of the shock wave 416 for cracking the process fluid F. The proposed turbomachine type chemical reactor 10 significantly reduces residence time of process fluid F in the chemical reactor 10 and improves the efficiency of the chemical reactor 10.

According to an aspect, the proposed turbomachine type chemical reactor 10 provides simultaneous heating and pressurization of process fluid F across the shock wave 416. The proposed turbomachine type chemical reactor 10 may reduce gas compressors and heat exchangers which are used in a furnace-type chemical reactor. The proposed turbomachine type chemical reactor 10 is significantly more compact compared to furnace-type chemical reactor. The proposed turbomachine type chemical reactor 10 thus reduces the cost and complexity of an oil refinery and petrochemical plant and improves reliability of the oil refinery and petrochemical plant.

Although various embodiments that incorporate disclosed concepts have been shown and described in detail herein, those skilled in the art can readily devise many other varied embodiments that still incorporate these disclosed concepts. Disclosed embodiments are not limited to the specific details of construction and the arrangement of components set forth in the description or illustrated in the drawings. Disclosed concepts may be implemented by other implementations, and of being practiced or of being carried out in various ways, which now would become apparent to one skilled in the art. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

REFERENCE LIST

10: Chemical Reactor
12: Longitudinal Axis
14: Rotary Shaft
16: Power Supply
17: Recuperator
18: Heating Device
100: Outer Casing
110: Flow Inlet
120: Flow Exit
130: Inner Shroud
140: Flow Path
150: Quenching Zone
152: Discharge Nozzle
200: Impeller Section
210: Rotating Impeller Blade
211: Leading Edge of Blade
212: Trailing Edge of Blade
213: Concave Side of Rotating Impeller Blade
214: Convex Side of Rotating Impeller Blade
215: Leading Edge Flow Direction
216: Trailing Edge Flow Direction
220: Rotor Disk
300: Stationary Bucket Section
310: Stationary Bucket Vane
311: Leading Edge of Stationary Bucket Vane
312: Trailing Edge of Stationary Bucket Vane
320: Stationary Bucket Vane Hub
400: Stationary Diffuser Section
410: Stationary Diffuser Vane
411: Leading Edge of Stationary Diffuser Vane
412: Trailing Edge of Stationary Diffuser Vane
413, 414: Opposing Sides of Stationary Diffuser Vane
415: Diffuser flow passage
416: Shock Wave
420: Stationary Diffuser Vane Hub
421: Aperture
500: Exhaust Section
510: Stationary Exhaust Vane
511: Leading Edge of Stationary Exhaust Vane
512: Trailing Edge of Stationary Exhaust Vane
513, 514: Opposing Sides of Stationary Exhaust Vane
515: Exhaust flow passage
520: Stationary Exhaust Vane Hub
522: Exhaust Cone
524: Exit Transition

What is claimed is:

1. A chemical reactor to process a process fluid, the chemical reactor comprising:
    an outer casing comprising a flow inlet for intaking the process fluid and a flow outlet for exiting the process fluid, wherein a flow path is defined within the outer casing extending axially along an inner shroud of the outer casing between the flow inlet and the flow outlet;
    a rotary shaft extending into the outer casing and coupled to a rotor disk, wherein the rotary shaft is driven by a power supply;
    a first impeller section and a second impeller section arranged downstream of the first impeller section, each impeller section comprising a respective plurality of rotating impeller blades positioned on the rotor disk, wherein the plurality of rotating impeller blades extends radially outwardly from the rotor disk into the flow path;
    a stationary bucket section arranged between the first impeller section and the second impeller section, the stationary bucket section configured to align a flow direction of process fluid flow discharged from trailing edges of rotating impeller blades in the first impeller section with the leading edges of rotating impeller blades in the second impeller section;
    a stationary diffuser section arranged downstream of the second impeller section, wherein the stationary diffuser section comprises a plurality of divergent diffuser flow passages;

an exhaust section arranged downstream of the stationary diffuser section, wherein the exhaust section comprises a plurality of convergent exhaust flow passages wherein the respective plurality of rotating impeller blades is configured to accelerate the process fluid to a supersonic flow, wherein the plurality of convergent exhaust flow passages is configured to provide a back pressure such that a shock wave is generated in the stationary diffuser section, wherein the shock wave generated in the stationary diffuser section increases a static temperature of the process fluid downstream of the shock wave to generate sufficient heat to process the process fluid, wherein the plurality of diffuser flow passages is configured to provide a flow property of the process fluid across the shock wave for processing the process fluid.

2. The chemical reactor as claimed in claim 1, wherein the flow property of the process fluid comprises a ratio of static temperature of the process fluid across the shock wave, wherein the ratio of the static temperature of the process fluid across the shock wave is increased by at least ten percent.

3. The chemical reactor as claimed in claim 1, wherein the flow property of the process fluid comprises a ratio of static pressure of the process fluid across the shock wave, wherein the ratio of static pressure of the process fluid across the shock wave comprises an increase of as much as two or three times.

4. The chemical reactor as claimed in claim 1, wherein the stationary diffuser section comprises a plurality of stationary diffuser vanes positioned on a stationary diffuser hub, wherein the plurality of stationary diffuser vanes are circumferentially spaced apart from each other and extends radially outwardly from the stationary diffuser hub into the flow path, and wherein each diffuser flow passage is defined circumferentially between adjacent stationary diffuser vanes and radially between the stationary diffuser hub and the inner shroud.

5. The chemical reactor as claimed in claim 4, wherein a divergent rate of each diffuser flow passage is adjusted to provide the flow property of the process fluid across the shock wave.

6. The chemical reactor as claimed in claim 4, wherein the stationary diffuser section comprises at least one aperture arranged on the stationary diffuser hub downstream of the shock wave, and wherein the aperture is configured to extract low molecule weight components from the process fluid.

7. The chemical reactor as claimed in claim 1, wherein the exhaust section comprises a plurality of stationary exhaust vanes positioned on a stationary exhaust hub, wherein the plurality of stationary exhaust vanes are circumferentially spaced apart from each other and extend radially outward from the stationary exhaust hub into the flow path, and wherein each exhaust flow passage is defined circumferentially between adjacent stationary exhaust vanes and radially between the stationary exhaust hub and the inner shroud.

8. The chemical reactor as claimed in claim 7, wherein a convergent rate of each exhaust flow passage is adjusted to provide the flow property of the process fluid across the shock wave.

9. The chemical reactor as claimed in claim 1, further comprising a quenching zone arranged downstream of the second impeller section, wherein the quenching zone comprises at least one nozzle for introducing coolant flow into the process fluid.

10. A method for processing a process fluid comprising:
providing a chemical reactor comprising:
an outer casing comprising a flow inlet for intaking the process fluid and a flow outlet for exiting the process fluid, wherein a flow path is defined within the outer casing extending axially along an inner shroud of the outer casing between the flow inlet and the flow outlet;
a rotary shaft extending into the outer casing and coupled to a rotor disk, wherein the rotary shaft is driven by a power supply;
a first impeller section and a second impeller section arranged downstream of the first impeller section, each impeller section comprising a respective plurality of rotating impeller blades positioned on the rotor disk, wherein the plurality of rotating impeller blades extends radially outwardly from the rotor disk into the flow path;
a stationary bucket section arranged between the first impeller section and the second impeller section, the stationary bucket section configured to align a flow direction of process fluid flow discharged from trailing edges of rotating impeller blades in the first impeller section with the leading edges of rotating impeller blades in the second impeller section;
a stationary diffuser section arranged downstream of the second impeller section, wherein the stationary diffuser section comprises a plurality of divergent diffuser flow passages;
a stationary diffuser section arranged downstream of the impeller section, wherein the stationary diffuser section comprises a plurality of divergent diffuser flow passages;
an exhaust section arranged downstream of the stationary diffuser section,
wherein the exhaust section comprises a plurality of convergent exhaust flow passages,
rotating the respective plurality of rotating impeller blades by the rotary shaft for accelerating the process fluid to a supersonic flow;
generating a shock wave in the stationary diffuser section by providing a back pressure, wherein the shock wave generated in the stationary diffuser section increases a static temperature of the process fluid downstream of the shock wave to generate sufficient heat to process the process fluid; and
processing the process fluid using a flow property of the process fluid across the shock wave.

11. The method as claimed in claim 10, wherein the flow property of the process fluid comprises a ratio of static temperature of the process fluid across the shock wave, wherein the ratio of the static temperature of the process fluid across the shock wave is increased by at least ten percent.

12. The method as claimed in claim 10, wherein the flow property of the process fluid comprises a ratio of static temperature of the process fluid across the shock wave, wherein the ratio of the static temperature of the process fluid across the shock wave is increased by at least ten percent.

13. The method as claimed in claim 10, wherein the stationary diffuser section comprises a plurality of stationary diffuser vanes positioned on a stationary diffuser hub, wherein the plurality of stationary diffuser vanes are circumferentially spaced apart from each other and extend radially outward from the stationary diffuser hub into the flow path, and wherein each diffuser flow passage is defined circumferentially between adjacent stationary diffuser vanes and radially between the stationary diffuser hub and the inner shroud.

14. The method as claimed in claim 13, further comprising adjusting a divergent rate of each diffuser flow passage to provide the flow property of the process fluid across the shock wave.

15. The method as claimed in claim 14, wherein the stationary diffuser section comprises at least one aperture arranged on the stationary diffuser hub downstream of the shock wave, and wherein the method further comprising extracting low molecule weight components from the process fluid through the aperture.

16. The method as claimed in claim 10, wherein the exhaust section comprises a plurality of stationary exhaust vanes positioned on a stationary exhaust hub, wherein the plurality of stationary exhaust vanes are circumferentially spaced apart from each other and extends radially outwardly from the stationary exhaust hub into the flow path, and wherein each exhaust flow passage is defined circumferentially between adjacent stationary exhaust vanes and radially between the stationary exhaust hub and the inner shroud.

17. The method as claimed in claim 16, further comprising adjusting a convergent rate of each exhaust flow passage to provide the flow property of the process fluid across the shock wave.

18. The method as claimed in claim 10, further comprising arranging a quenching zone downstream of the second impeller section, wherein the quenching zone comprises at least one nozzle for introducing coolant flow into the process fluid.

19. The method as claimed in claim 15, wherein a low molecule weight component extracted from the process fluid through the at least one aperture is hydrogen.

* * * * *